(12) United States Patent
Bugge

(10) Patent No.: US 11,733,011 B2
(45) Date of Patent: Aug. 22, 2023

(54) STEERING SYSTEM WITH POWER TAKE-OFF FROM ACTUATORS

(71) Applicant: Raytheon Company, Waltham, MA (US)

(72) Inventor: John Bugge, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 85 days.

(21) Appl. No.: 17/102,648

(22) Filed: Nov. 24, 2020

(65) Prior Publication Data

US 2022/0163302 A1 May 26, 2022

(51) Int. Cl.
*F02K 9/90* (2006.01)
*F42B 10/66* (2006.01)
*F02K 9/80* (2006.01)

(52) U.S. Cl.
CPC ............ *F42B 10/665* (2013.01); *F02K 9/805* (2013.01); *F02K 9/90* (2013.01)

(58) Field of Classification Search
CPC . F02K 1/002; F02K 9/80; F02K 9/805; F02K 9/90; F02K 99/00; F42B 10/665
See application file for complete search history.

(56) References Cited

U.S. PATENT DOCUMENTS

| | | | | |
|---|---|---|---|---|
| 4,272,040 A * | 6/1981 | Bastian | ..................... | F02K 9/90 239/265.19 |
| 4,274,610 A | 6/1981 | Bastian | | |
| 4,299,534 A * | 11/1981 | Yamane | ................... | F03B 3/183 464/33 |
| 5,082,202 A * | 1/1992 | Jacobson | ................ | F42B 15/36 244/3.22 |
| 5,511,745 A * | 4/1996 | Faupell | ................... | F02K 1/008 239/265.19 |
| 6,354,978 B1* | 3/2002 | Brackin | ................. | F16H 48/08 475/237 |
| 6,726,147 B1* | 4/2004 | Perini | ..................... | F42B 10/64 244/3.28 |
| 2002/0130216 A1* | 9/2002 | Facciano | .................. | F02K 9/90 244/3.24 |

(Continued)

FOREIGN PATENT DOCUMENTS

| CN | 1693691 | * 11/2005 |
|---|---|---|
| EP | 0744591 | * 11/1996 |

(Continued)

*Primary Examiner* — Gerald L Sung
(74) *Attorney, Agent, or Firm* — Renner, Otto, Boisselle & Sklar, LLP

(57) ABSTRACT

A power take-off (PTO) system includes a spur pinion on a shaft, used to turn a sector face gear that is coupled to a surface to be turned, such as a jet vane in a rocket nozzle. These may be parts of a thrust vectoring system, with the PTO system used to connect to a control surface actuator for a control surface such as a fin. The mechanical coupling between the fin and the jet vane may enable steering of a flight vehicle such as a missile at both low speeds and high speeds, with the thrust vectoring by the jet vane effective at low airspeeds and the control surface movement used for steering at high airspeeds. The PTO system may be backward compatible with prior systems, while allowing a more direct connection between the control surface actuator and the thrust vectoring system, with a reduced number of parts.

18 Claims, 6 Drawing Sheets

(56) References Cited

U.S. PATENT DOCUMENTS

| | | | | |
|---|---|---|---|---|
| 2012/0032659 A1* | 2/2012 | Kurosawa | ........... | H02M 3/1588 |
| | | | | 323/282 |
| 2015/0037163 A1* | 2/2015 | Ikegaya | ................ | F04D 29/388 |
| | | | | 416/223 R |

FOREIGN PATENT DOCUMENTS

| | | | |
|---|---|---|---|
| JP | H02277952 | * | 11/1990 |
| JP | H08511339 | * | 11/1996 |
| WO | WO018376 | * | 3/2001 |

* cited by examiner

STEERING SYSTEM WITH POWER TAKE-OFF FROM ACTUATORS

FIELD OF THE INVENTION

The invention is in the field of actuators and power take-offs from such actuators, for example for use in steering systems.

DESCRIPTION OF THE RELATED ART

Rotational actuators are used in a variety of situations. One example is in aerospace vehicles.

In some instances a power take-off (PTO) shaft from a control surface actuator is used to operate a rocket nozzle jet vane in synchronicity such that low-speed control is enabled.

SUMMARY OF THE INVENTION

A power take-off (PTO) from a control surface actuator includes a PTO drive pinion that engages a sector face gear.

A PTO from a control surface actuator includes a PTO drive pinion that engages an output from the control surface actuator, with the drive pinion used to turn a jet vane for thrust vectoring. The PTO drive pinion may be on aligned with the jet vane.

According to an aspect of the invention, a power take-off system for use with an actuator, the power take-off system including: a gear shaft configured to engage the actuator, with the actuator directly driving the gear shaft; a drive pinion on the gear shaft; a face gear sector that engages the drive pinion; and a rotatable surface that is operatively coupled to the face gear sector, such that the rotatable surface rotates along with the face gear sector.

According to an embodiment of any paragraph(s) of this summary, the rotatable surface is a jet vane.

According to an embodiment of any paragraph(s) of this summary, the rotatable surface has an integrally-formed shaft extending from a blade of the rotatable surface.

According to an embodiment of any paragraph(s) of this summary, the rotatable surface is made of pressed powered metal.

According to an embodiment of any paragraph(s) of this summary, the integrally-formed shaft has a non-circular cross-section shape that mates with an inner opening of a bearing sleeve that engages the shaft.

According to an embodiment of any paragraph(s) of this summary, the system further including a key that mechanically couples the bearing sleeve and the face gear sector.

According to an embodiment of any paragraph(s) of this summary, the key engages an inner notch in the face gear sector and a slot in the bearing sleeve.

According to an embodiment of any paragraph(s) of this summary, the drive pinion is press fit on the gear shaft.

According to an embodiment of any paragraph(s) of this summary, the system further including a cap that has an opening through which passes the integrally-formed shaft.

According to an embodiment of any paragraph(s) of this summary, the system further including an annular insulator engaged by the cap.

According to an embodiment of any paragraph(s) of this summary, the gear shaft engages a housing, as part of a jet vane drive.

According to an embodiment of any paragraph(s) of this summary, the system further including additional power take-offs engaging the housing.

According to an embodiment of any paragraph(s) of this summary, in combination with actuators operatively coupled to the power take-offs, to rotate jet vanes coupled to respective of the power take-offs.

According to an embodiment of any paragraph(s) of this summary, the combination is part of an air vehicle.

According to an embodiment of any paragraph(s) of this summary, the actuators are also operatively coupled to control surfaces of the air vehicle.

According to an embodiment of any paragraph(s) of this summary, the jet vanes are in a nozzle of a rocket motor of the air vehicle.

According to another aspect of the invention, a thrust vector control (TVC) vane drive system includes: a housing; jet vane drives mechanically coupled to the housing, each of the jet vane drives including: a gear shaft configured to engage an actuator, with the actuator directly driving the gear shaft; a drive pinion on the gear shaft; a face gear sector that engages the drive pinion; and a jet vane that is operatively coupled to the face gear sector, such that the jet vane rotates along with the face gear sector.

According to an embodiment of any paragraph(s) of this summary, the actuators are control surface actuators in the housing, for moving respective control surfaces.

According to yet another aspect of the invention of the invention, a method of vector control of a flight vehicle includes: using jet vane drives to turn jet vanes in a housing, with, for each of the jet vane drives: a face gear sector of the jet vane drive operatively coupled to the jet vane, to rotate with the face gear sector; a drive pinion that engages the face gear sector to rotate the face gear sector; and an actuator directly driving a gear shaft, with the drive pinion mounted on the gear shaft.

According to an embodiment of any paragraph(s) of this summary, the method further includes turning control surfaces of the flight vehicles using the actuators.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A power take-off (PTO) system includes a spur pinion on a shaft, used to turn a sector face gear that is coupled to a surface to be turned, such as a jet vane in a rocket nozzle. These may be parts of a thrust vectoring system, with the PTO system used to connect to a control surface actuator for a control surface such as a fin. The mechanical coupling between the fin and the jet vane may enable steering of a flight vehicle such as a missile at both low speeds and high speeds, with the thrust vectoring by the jet vane effective at low airspeeds and the control surface movement used for steering at high airspeeds. The PTO system may be backward compatible with prior systems, while allowing a more direct connection between the control surface actuator and the thrust vectoring system, with a reduced number of parts.

Figure 1:
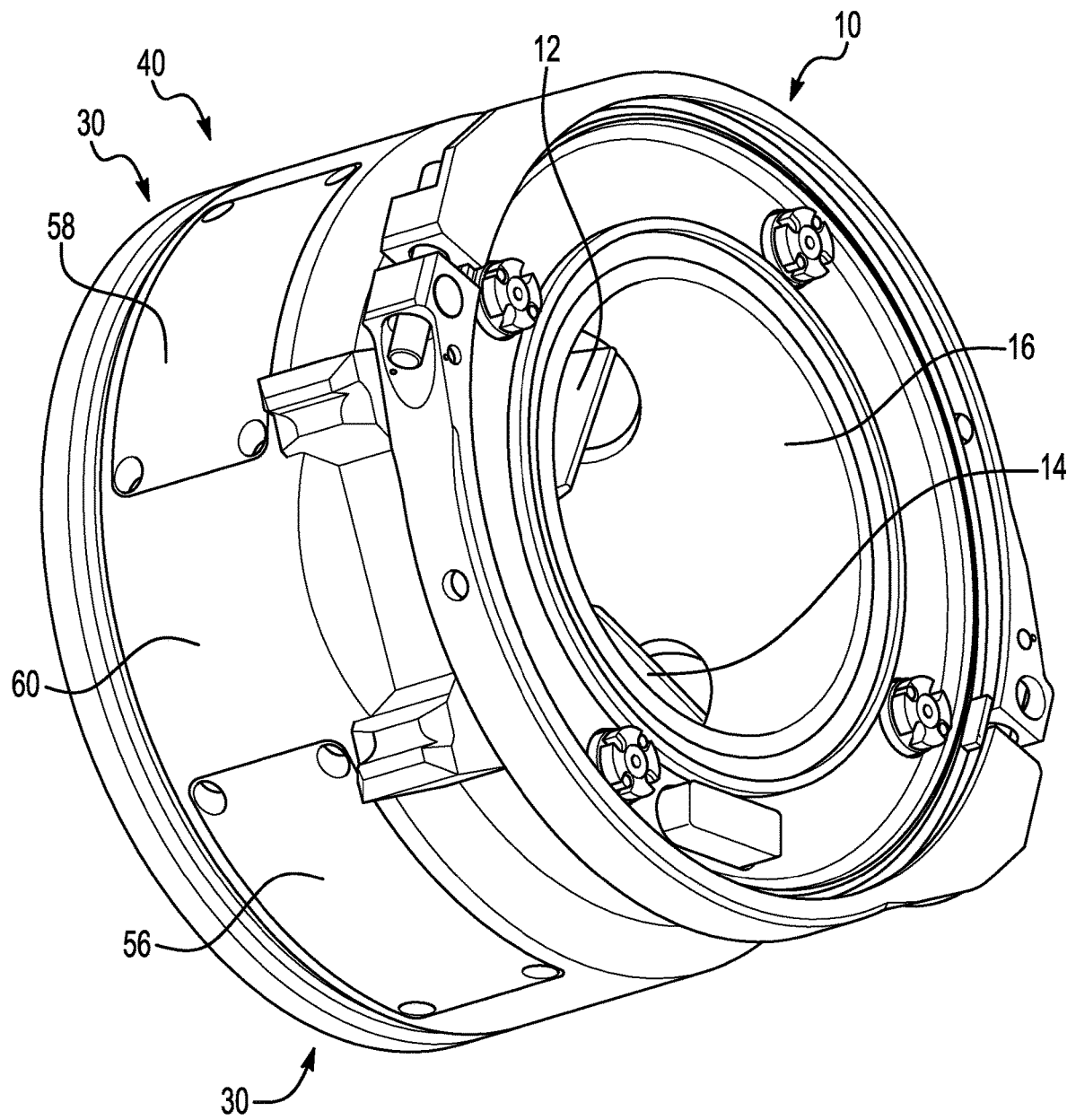
FIG. 1 is an oblique view of parts of a steering system according to an embodiment of the invention.

FIG. 1 shows a thrust vectoring system 10 that is used for actuating a set of jet vanes, for example jet vanes 12 and 14, within a nozzle 16. The jet vane system 10 may be used to provide thrust vectoring during initial launch, such as of an air vehicle, for example a missile, before the air vehicle reaches a speed at which it may be steered using control surfaces, such as fins (or canards, among many other possible types of control surfaces), that use aerodynamic forces. The system 10 may be part of a larger control system that is used for control of the air vehicle, and which may have actuators mechanically coupled to both the control surfaces and to jet vanes such as the jet vanes 12 and 14.

Figure 2:
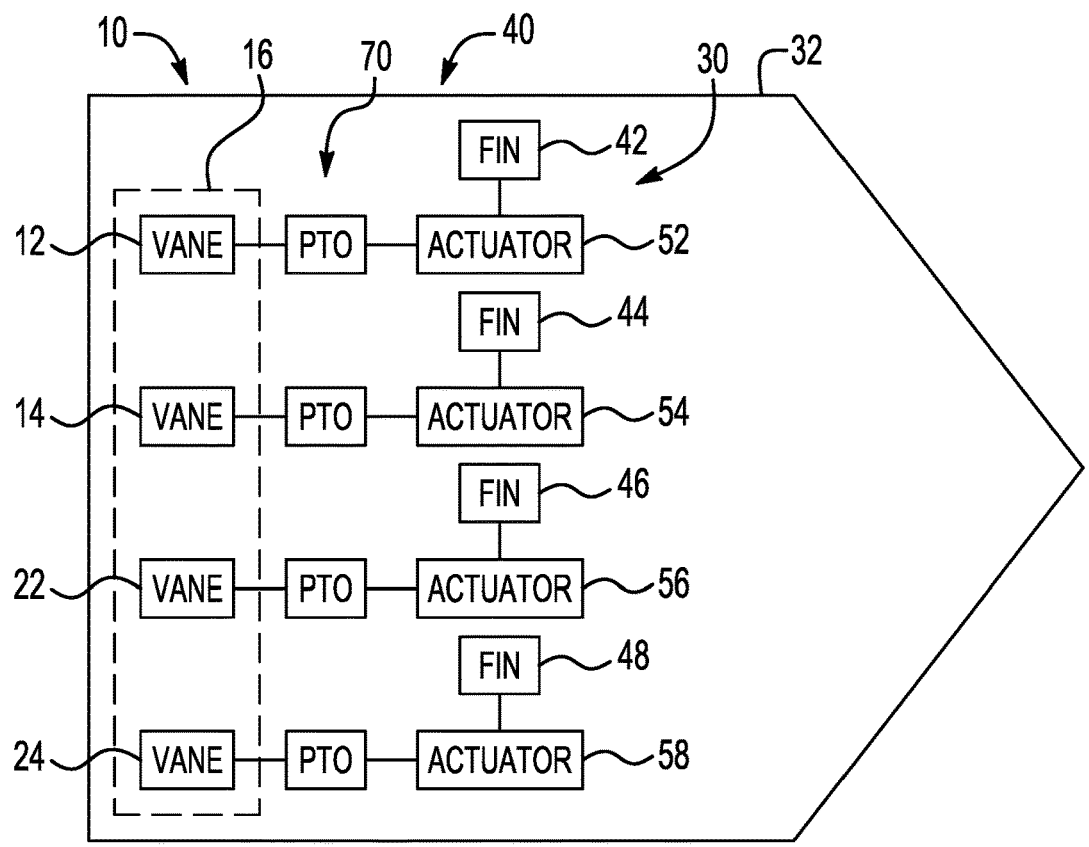
FIG. 2 is a schematic diagram of an air vehicle that includes the steering system of FIG. 1.

Referring in addition to FIG. 2, the thrust vectoring system 10 interfaces with a control actuator system (CAS) 30 of a flight vehicle 32, such as a missile. The systems 10 and 30 together constitute a steering system 40. The steering system 40 may be capable of changing the direction of the flight vehicle 32 at high-speed and low-speed conditions. The thrust vectoring system 10 operates the jet vanes 12, 14, 22, and 24 to control steering at low speeds, and the CAS system 30 control surfaces (fins) 42, 44, and 46, and 48, to effect steering at high speeds. Actuators 52, 54, 56, and 58 of the CAS 30 may be any of a variety of suitable mechanisms for directly turning the fins 42-48 and indirectly turning the vanes 12, 14, 22, and 24, such as described below. The connection between the actuators 52-60 and the vanes 12, 14, 22, and 24 occurs at PTO interface locations 62, 64, 66, and 68 of a power take off (PTO) drive or system 70.

Figure 3:
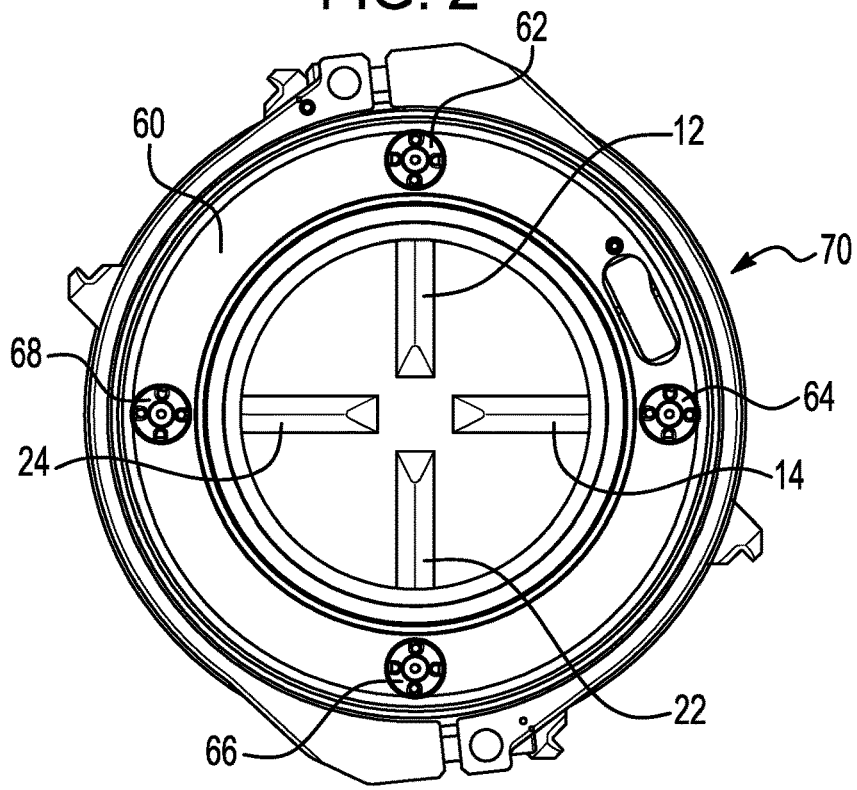
FIG. 3 is an end view of steering system of FIG. 1.

With reference now in addition to FIG. 3, a housing 60 of the steering system 40 includes the interface locations 62, 64, 66, and 68, corresponding to respective of the actuators 52-58. The interface locations 62-68 are where a power take off (PTO) drive or system 70 connects up the CAS 30 (FIG. 2) to the thrust vector system 10, with the actuators 52-58 (FIG. 2) mechanically coupled at respective of the interface locations 62-68, to respective of the jet vanes 12, 14, 22, and 24.

Figure 4:
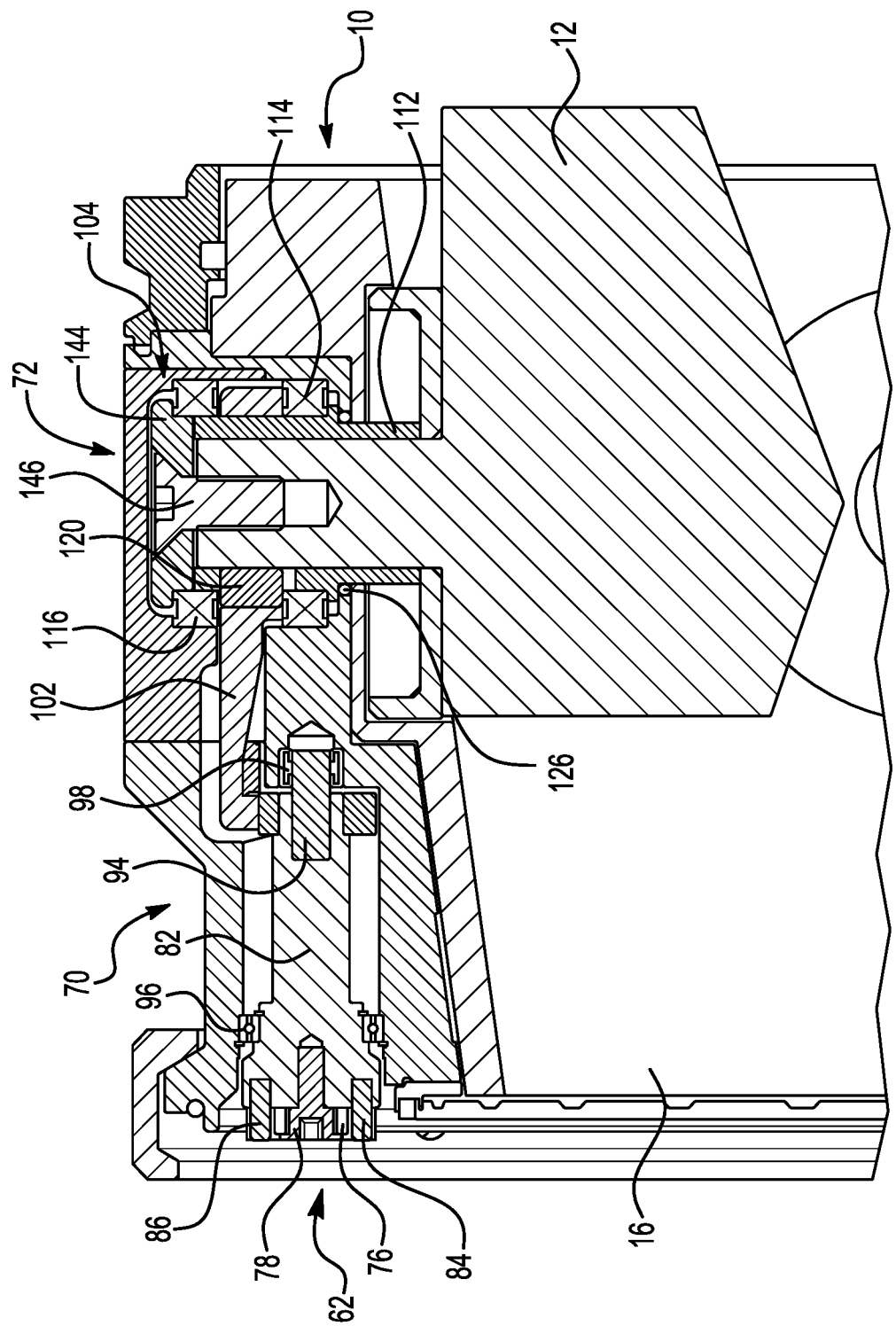
FIG. 4 is a side sectional of a portion of a thrust vectoring system of the steering system of FIG. 1.
Figure 5:
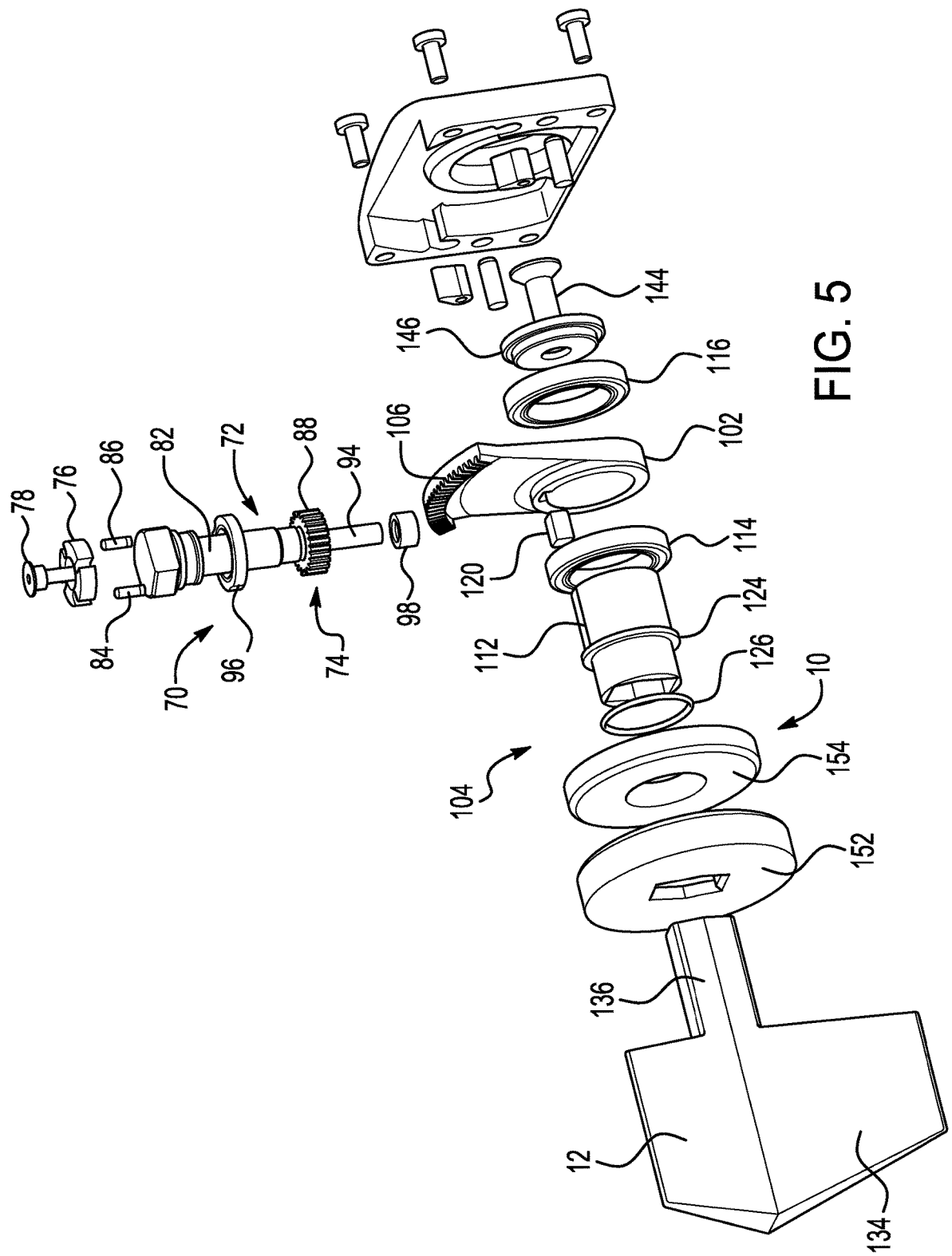
FIG. 5 is an exploded view of the portion of the thrust vectoring system shown in FIG. 4.

FIGS. 4 and 5 show further details of interior parts of the thrust vector system 10 and the PTO system 70. The explanation below is with regard to a mechanism 72 for turning the vane 12, with a PTO from one of the actuators 52-58 (FIG. 2). It will be understood that each of the vanes 12, 14, 22, and 24 (FIG. 3) may have a similar mechanism for turning. At the interface 62 the mechanism 72 has a drive shaft subassembly 74 that includes a notched cap 76. A threaded fastener 78 secures the cap 76 to a spur pinion shaft 82, and a pair of pins 84 and 86 prevent relative rotation between the cap 76 and the spur pinion shaft 82. A spur pinion 88 is secured to the opposite end of the spur pinion shaft 82, with a dowel bearing pin 94 extending out from that end of the spur piston shaft 82. The dowel bearing pin 94 may be press fit into a suitable opening in the end of the spur pinion shaft 82. A pair of bearings 96 and 98 support the spur pinion shaft 82 and the dowel bearing pin 94, respectively, and enable rotation of the drive shaft subassembly 74 relative to various parts of the housing 60.

The spur pinion 82 engages a face gear quadrant (sector face gear) 102 that is part of a vane subassembly 104. Teeth 106 of the face gear quadrant 102 engage the teeth of the spur pinion 88 such that when the shaft 82 is rotated the face gear quadrant 102 rotates, which in turn rotates the vane 12. It will be appreciated that the sector face gear 102 need not be a quadrant, but may be limited in size to fit into the available volume, and to avoid unnecessary material and weight.

The sector face gear 102 is mounted on a bearing sleeve 112, with bearings 114 and 116 also mounted on the bearing sleeve 112 on opposite respective sides (above and below in the illustrated embodiment) of the face gear quadrant 102. A key 120 engages the face gear quadrant 102 and the bearing sleeve 112, so that the face gear quadrant 102 and the bearing sleeve 112 rotate together. The bearing sleeve 112 has a central circumferential ridge 124 that acts as a stop to limit insertion of the bearing sleeve 112 into the housing 60, and as a retainer for the bearing 116. A plain or sliding bearing 126 is located on the underside of the ridge 124. As seen best in FIG. 5, the plain bearing 126 facilitates turning of the sleeve 112 relative to an inner portion 130 of the housing 60 that is located adjacent to the nozzle 16.

Figure 6:
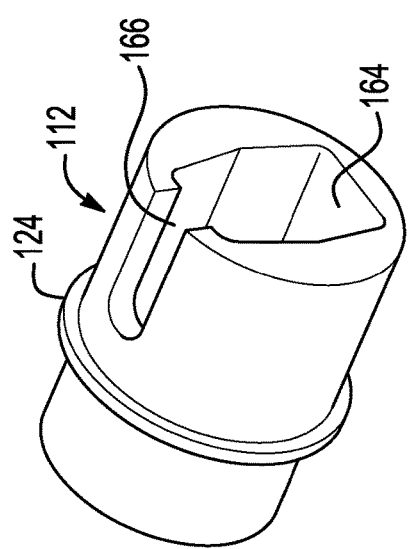
FIG. 6 is an oblique view of a jet vane of the thrust vectoring system.

With reference now in addition to FIG. 6, the vane 12 is formed as a single piece, and has a vane blade 134 and a vane shaft 136. The shaft 136 has a threaded hole 140 therein for receiving a threaded fastener 144 (FIGS. 4 and 5) that secures a retaining cap 146 to the vane shaft 136. The vane blade 134 may have a quadrilateral cross-section shape, with ramped upstream and downstream shapes. The vane shaft 136 has a polygonal cross-section shape that corresponds to the shape of an opening in the bearing sleeve 112, as described further below. These cross-sectional shapes for the vane blade 134 and the vane shaft 136 are only examples, and that many other cross-sectional shapes are possible.

The vane 12 may be made as a single piece from powdered metal. For example a rough version of the vane 12 may be powered pressed out of powdered metal. Then the pressed vane may be soft machined to near its final shape, with some allowance for changes in dimensions from further processing. Following the soft machining the vane 12 is subjected to hot isostatic press (HIP), followed by a final machining, including putting the threaded hole 140 in the vane shaft 136.

The vane 12 may be made of a suitable material that is able to withstand the heat and other environmental conditions within the nozzle 16. An example suitable material is copper infiltrated tungsten (CIT).

Referring back to FIGS. 4 and 5, CIT cap 152 and an insulator 154 surround the bottom of the vane shaft 136, where the vane shaft 136 meets the vane blade 134. The cap 152 provides an exposed surface that can withstand the flow past of hot pressurized gases (through the nozzle 16). The insulator 154 helps prevent conduction of heat to the interior parts of the mechanism 72.

Figure 7:
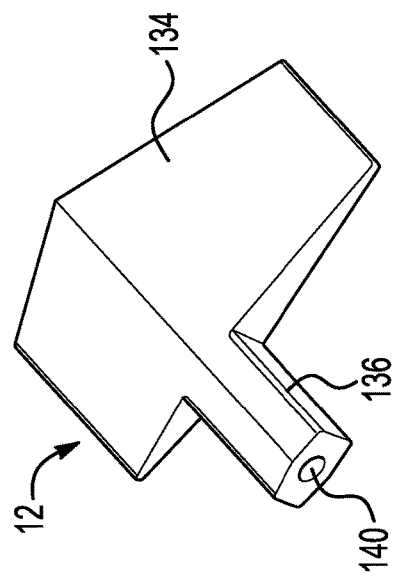
FIG. 7 is an oblique view of a bearing sleeve of the thrust vectoring system of FIG. 4.

FIG. 7 shows further details of the bearing sleeve 112. The sleeve 112 has a central cavity 164 that may a shape corresponding to that of the vane shaft 136 (FIG. 6). The cavity 164 may be produced by precision broaching, or by another suitable operation. A groove 166 may be cut in one side of the bearing sleeve 112, for receiving the key 120 (FIG. 4).

Figure 8:
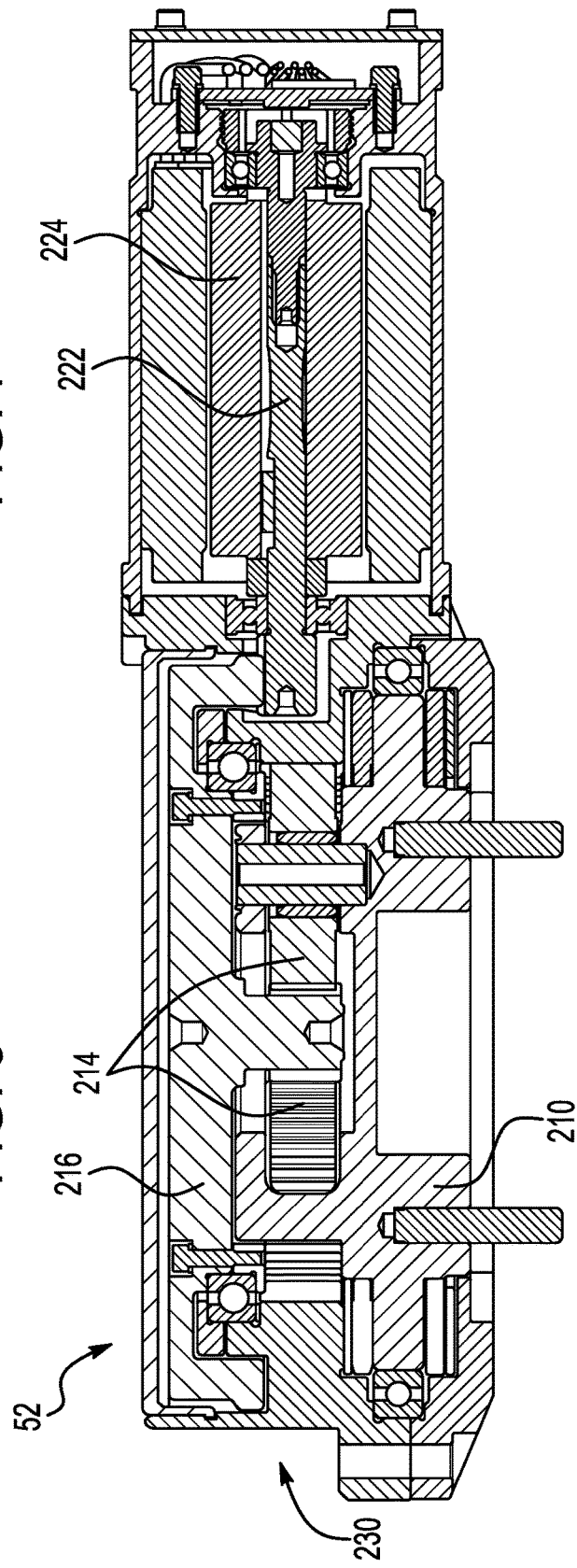
FIG. 8 is a side sectional view of a control surface actuator of the steering system.

FIG. 8 shows details of the actuator 52, an example of one of the actuators 52-58 (FIG. 2). The other actuators 54-58 may have similar features. The actuator 52 has an output shaft 210 that is coupled to a fin or other control surface 42 (FIG. 2). A system of gearing, including planetary gears 214 and a face gear 216, couples the output shaft 210 to a motor shaft 222 of a motor 224. A spur gear (not shown in FIG. 8) may interface with an opposite end of the face gear 216, at a location 230. This additional spur gear may be mechanically coupled to the spur pinion shaft 82 (FIG. 4), to both turn the vane 12 (FIG. 1) and to provide PTO at the location 62 (FIG. 3). Further details may be found in co-owned U.S. patent application Ser. No. 16/893,635, filed Jun. 5, 2020, which is incorporated by reference in its entirety. It will be appreciated that many other alternative configurations for the actuators 52-58 are possible.

Figure 9:
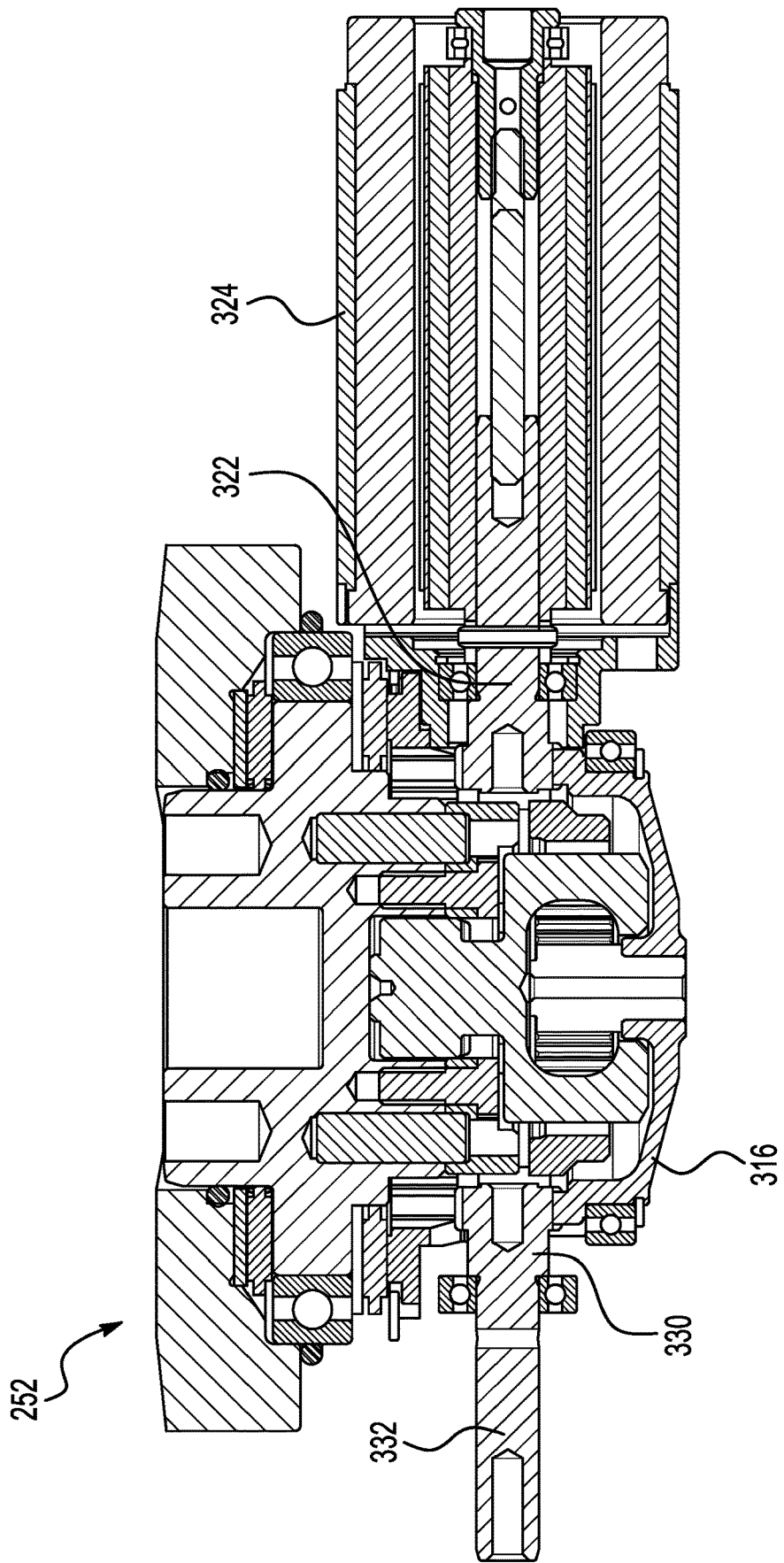
FIG. 9 is a side sectional view of an alternative embodiment control surface actuator usable as part of the steering system.

FIG. 9 shows another alternative, an actuator 252 that may be used as an alternative to the actuator 52 (FIG. 8). The actuator 252 has a face gear 316 that is part of a set of gearing for turning an output shaft 310. The face gear 316 is coupled at one end to a motor shaft 322 of a motor 324, and at an opposite end to a spur gear 330 on a shaft 332, that is coupled to the rest of a power take off.

The PTO system 10 described above may be utilized for other types of PTOs, used for other types of system for moving other sorts of surfaces, especially where the surfaces are to be mechanically coupled to move in concert. The systems described herein have the advantages of requiring few parts, requiring less machining in the housing, and being backward compatible with more complicated prior systems.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power take-off system for use with an actuator, the power take-off system comprising:
    a gear shaft configured to engage the actuator, with the actuator directly driving the gear shaft;
    a drive pinion on the gear shaft;
    a face gear sector that engages the drive pinion;
    a bearing sleeve, wherein the bearing sleeve is partially inserted into and directly engages the face gear sector, such that the bearing sleeve rotates along with the face gear sector; and
    a rotatable surface that is operatively coupled to the bearing sleeve, wherein the rotatable surface includes a section with a non-circular cross-section shape that mates with a corresponding cavity in the bearing sleeve, such that the rotatable surface rotates along with the face gear sector.

2. The power take-off system of claim 1, wherein the rotatable surface is a jet vane.

3. The power take-off system of claim 2, wherein the gear shaft engages a housing.

4. The power take-off system of claim 3, wherein the power take-off system comprises a plurality of power take-off systems that engage the housing.

5. The power take-off system of claim 4, wherein the plurality of power take-off systems include respective jet vanes coupled thereto, further including actuators operatively coupled to the plurality of power take-off systems, to rotate the respective jet vanes.

6. The power take-off system of claim 5,
    wherein the power take-off system is part of an air vehicle;
    wherein the respective actuators of the plurality of power take-off systems are also operatively coupled to control surfaces of the air vehicle.

7. The power take-off system of claim 6, wherein the jet vanes of the respective power take-off systems are in a nozzle of a rocket motor of the air vehicle.

8. The power take-off system of claim 1, wherein the rotatable surface has an integrally-formed shaft extending from a blade of the rotatable surface.

9. The power take-off system of claim 8, wherein the rotatable surface is made of pressed powdered metal.

10. The power take-off system of claim 8, further comprising a cap that has an opening through which passes the integrally-formed shaft.

11. The power take-off system of claim 10, further comprising an annular insulator engaged by the cap.

12. The power take-off system of claim 1, further comprising a key that mechanically couples the bearing sleeve and the face gear sector.

13. The power take-off system of claim 1, wherein the drive pinion is press fit on the gear shaft.

14. A power take-off system for use with an actuator, the power take-off system comprising:
    a gear shaft configured to engage the actuator, with the actuator directly driving the gear shaft;
    a drive pinion on the gear shaft;
    a face gear sector that engages the drive pinion;
    a bearing sleeve, wherein the bearing sleeve is operatively coupled to the face gear sector, such that the bearing sleeve rotates along with the face gear sector; and
    a rotatable surface that is operatively coupled to the bearing sleeve, wherein the rotatable surface includes a section with a non-circular cross-section shape that mates with a corresponding cavity in the bearing sleeve, such that the rotatable surface rotates along with the face gear sector; and
    a key that mechanically couples the bearing sleeve and the face gear sector;
    wherein the key engages an inner notch in the face gear sector and a slot in the bearing sleeve.

15. A thrust vector control (TVC) vane drive system comprising:
    a housing; and
    jet vane drives mechanically coupled to the housing, each of the jet vane drives including:

a gear shaft configured to engage an actuator, with the actuator directly driving the gear shaft;

a drive pinion on the gear shaft;

a face gear sector that engages the drive pinion;

a bearing sleeve, wherein the bearing sleeve is operatively coupled to the face gear sector, such that the bearing sleeve rotates along with the face gear sector, wherein the bearing sleeve includes a ridge extending on an outer surface of the bearing sleeve and the ridge is spaced from the ends of the bearing sleeve to act on a surface of the housing to limit insertion of the bearing sleeve into the housing; and a jet vane that is operatively coupled to the bearing sleeve, such that the jet vane rotates along with the face gear sector.

16. The system of claim 15, wherein the actuators are control surface actuators in the housing, for moving respective control surfaces.

17. The system of claim 15, wherein the jet vane drives are four jet vane drives circumferentially spaced on the housing.

18. The system of claim 15, wherein the housing forms a nozzle in the interior of the housing, wherein a portion of the jet vane is arranged to extend from the housing into the nozzle.

* * * * *